United States Patent Office 3,487,230
Patented Dec. 30, 1969

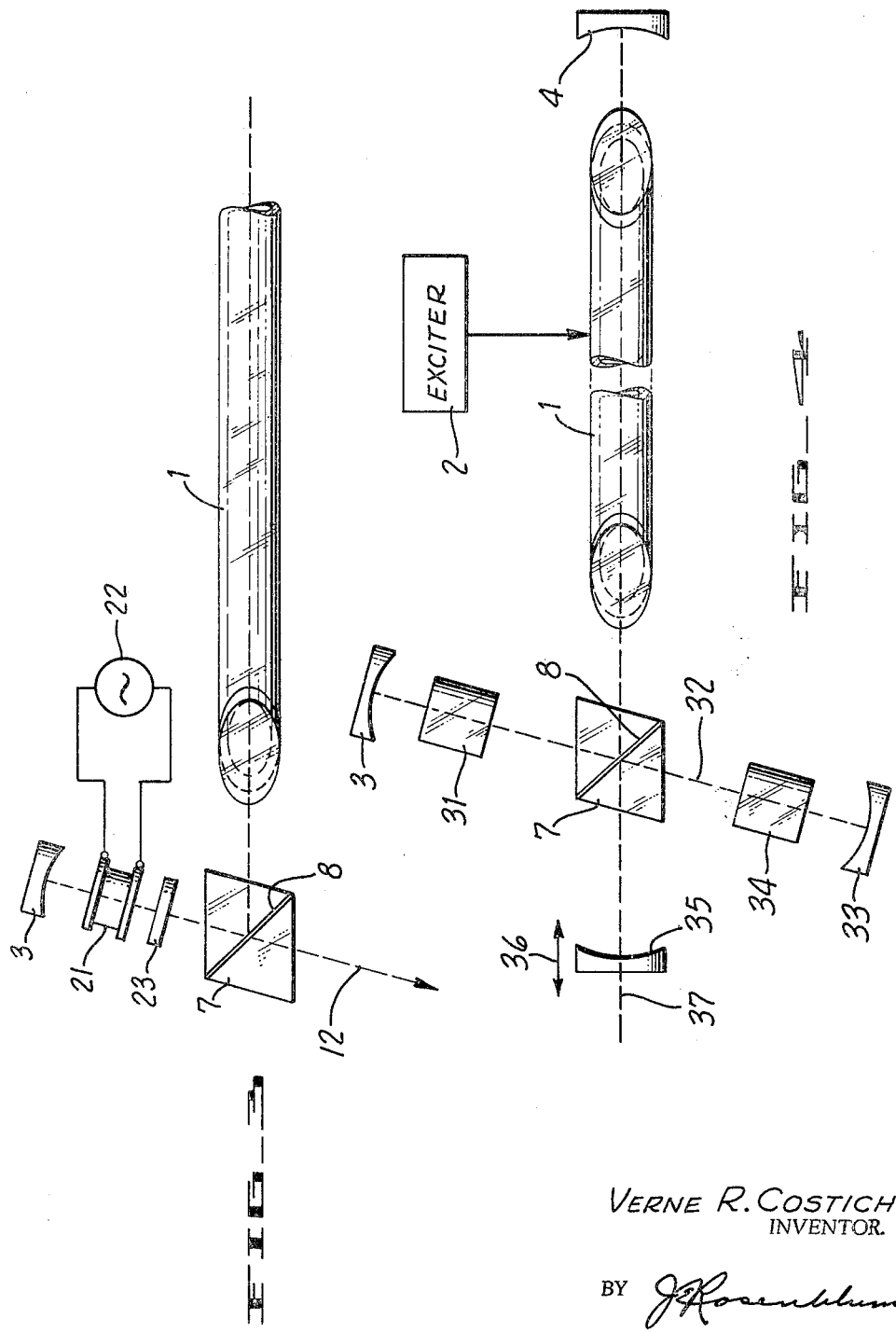

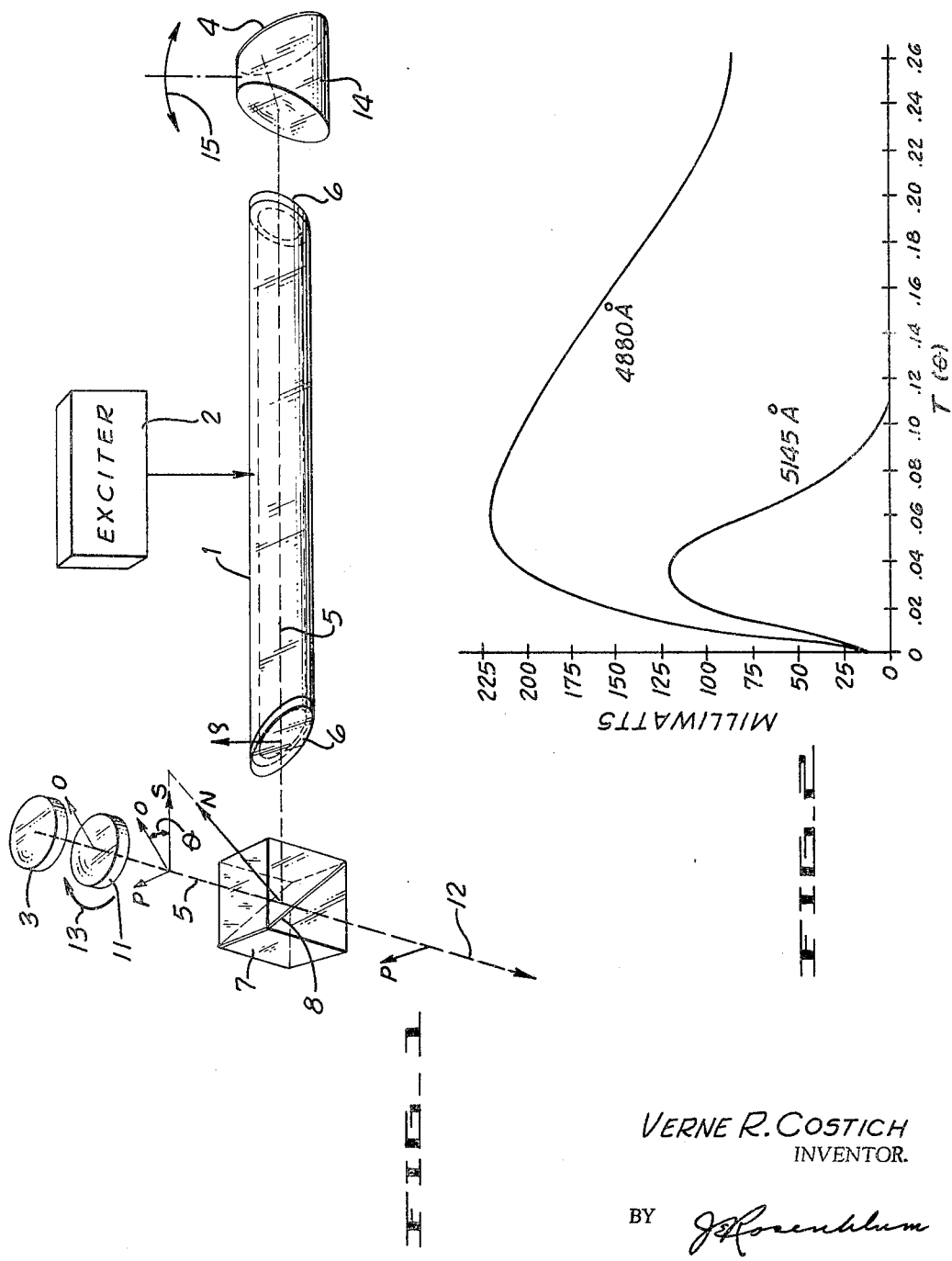

3,487,230
OPTICAL RESONATOR APPARATUS
Verne R. Costich, Mountain View, Calif., assignor to Spectra-Physics, Inc., Mountain View, Calif., a corporation of California
Filed Nov. 4, 1966, Ser. No. 592,005
Int. Cl. H03f 7/00
U.S. Cl. 307—88.3       5 Claims

ABSTRACT OF THE DISCLOSURE

Optical resonator apparatus in which confined optical radiation of one polarization is reflected over a given path by a multilayer film beam splitter. Inside of the optical resonator are located an active laser medium which amplifies this radiation and a device which introduces radiation of orthogonal polarization in a limited region of the resonator. The radiation of orthogonal polarization is transmitted out of the optical resonator directly from the limited region. In certain embodiments, the resonator radiation reflected by the beam splitter is passed through a retardation plate to an end reflector which reflects the radiation back through the plate to the beam splitter, and the amount of orthogonal polarization introduced by the plate and reflected out of the resonator is controlled either by rotating the plate, for example to maximize the resonator output at a given laser wavelength, or by applying an electric field to the plate, for example to modulate the resonator output in accordance with a given electrical signal applied to the plate. In other embodiments: the retardation plate is replaced by a sample of matter generating radiation, at harmonic or other frequencies, of orthogonal polarization which is reflected directly out of the resonator by the beam splitter; and the beam splitter is used to couple radiation from the optical resonator to a second optical resonator by transmission and then reflect radiation with polarization orthogonal to the transmitted radiation, introduced in the second resonator, out of the second resonator. A tuneable parametric generator is disclosed in which harmonic radiation from the first resonator is used to pump a parametrically-amplifying sample in the second resonator, with the amplified radiation in the second resonator being reflected by the beam splitter out of the second resonator into a tuneable idler resonator.

---

The present invention relates to optical resonators as used for establishing high-intensity optical waves which interact with matter in such devices as lasers and parametric amplifiers, and more particularly to improved means for coupling out power from such optical resonators.

An optical resonator comprises a plurality of mirrors for constraining optical radiation by reflection in a confined region. The usual technique for coupling power out of the resonator is to make one of the mirrors partially transmitting. This has the disadvantage that the coupling cannot conveniently be varied continuously so as to set same at any desired value with high resolution. Other techniques have been proposed, but these have not proved to be entirely satisfactory. For example, the use of a plate inclined near Brewster's angle for reflecting radiation from the resonator introduces considerable loss; and a beam splitter with moveable parts for changing the amount of power in a beam directed out of the resonator is unduly sensitive to thermal and microphonic disturbances.

It is the object of the present invention to provide an output coupler which overcomes these limitations and provides additional advantages and flexibility. Generally speaking, this is accomplished by the provision of means for controllably introducing a given polarization component to radiation in a limited portion of said resonator and means for transmitting substantially all of the radiation having said polarization directly out of the resonator.

The various features and advantages of the invention will become more apparent upon a consideration of the following specification, taken in connection with the accompanying drawing, wherein:

FIGURE 1 is a partially-schematic, perspective view of a laser embodying an output coupler in accordance with the present invention;

FIGURE 2 is a plot of the output power of a laser, constructed as shown in FIGURE 1, as a function of the transmittance of the output coupler;

FIGURE 3 is a partially-schematic, fragmentary plan view of a modification of the laser of FIGURE 1 including means for applying a modulating signal; and FIGURE 4 is a partially-schematic plan view of a frequency-doubling laser and a parametric amplifier, employing a common output coupler in accordance with the present invention.

Referring to FIGURE 1, an active laser medium 1 is excited by power source 2 to emit optical radiation which is reflected back and forth between resonator mirrors 3 and 4 along optical path 5–5' to establish a standing wave which is amplified by stimulated-emission interaction with the laser medium 1. The laser medium 1 is terminated at each end by surfaces 6 inclined at Brewster's angle with respect to axis 5 whereby the multiply-reflected wave of the optical resonator is plane polarized in the direction S which lies in the plane of incidence defined by the optical axis 5 and the normal to the Brewster surface 6.

In accordance with the present invention, a polarization-dependent beam splitter 7 is placed inside the optical resonator. Such a beam splitter may be constructed of two prisms, with one prism being coated on its base with a high reflectance multilayer dielectric film 8 and the second prism then being cemented to the first prism, base to base. Detailed descriptions of this type of beam splitter are found in U.S. Patent 2,403,731, issued to S. M. MacNeille and an article by A. F. Turner and P. W. Baumeister appearing in Applied Optics, vol. 5, No. 1, January 1966, pp. 69–76. The beam splitter 7 is oriented so that the beam 5 is incident on each interface of the multilayer film 8 at Brewster's angle. Any radiation polarized in the P direction lying in the plane of incidence defined by the beam 5' and the normal N to the film 8 is highly transmitted through the prism while the orthogonal or S polarization radiation is highly reflected by the film 8. In order to couple power out of the resonator, a local perturbation is introduced in the S-polarized resonator wave thereby causing a small amount of P-polarization to be introduced which is then transmitted directly through the beam splitter.

The embodiment of FIGURE 1 is particularly useful for optimizing laser output power under any given condition of excitation. Here the radiation reflected by film 8 is passed through a retardation plate 11 which introduces a phase delay $\phi$, the optical axis O of said plate being at an angle $\theta$ with the beam splitter plane of incidence. Under these conditions a P component of polarization is introduced in the beam which has passed through plate 11, been reflected by mirror 3, and has again passed through the plate 11. This component is highly transmitted through the beam splitter 8 to form the output beam 12. Under these conditions, transmittance T of the coupler is given by the equation:

$$T = \sin^2(2\theta) \sin^2 \phi \qquad (1)$$

One way of varying the coupling is to rotate the retardation plate 11 about the axis of beam 5', by means of any suitable rotation mounting shown schematically by the arrow 13, and thereby vary the angle $\theta$. For a quarter wave plate $\phi = \pi/2$ and the transmittance can be varied up to unity. Smaller retardations will give better control of small transmittances since the same rotation in $\theta$ covers a smaller range in T.

It should be noted that, as an alternative to the above-described retardation plate, other devices may be used to introduce the cross polarization P; for example, an internally-reflecting Dove prism may be used.

In a tested example of the embodiment shown in FIGURE 1, the laser was a gaseous argon ion laser providing strong laser oscillation at 4880 A. and 5145 A. The beam splitter 7 was made of two fused quartz prisms with a thirty layer stack 8 of $PbF_2$ and cryolite tuned for highest reflectance at 5145 A. at a 55° angle of incidence from fused quartz; and the retardation plate 11 was mica. The mirror 4 was coated on the rear of a Brewster-angle prism 14 which was rotated by means 15 to select the operating wavelength at which the dispersion of prism 14 causes the beam 5 to be incident normal to mirror 4. The measured power of output beam 12, at each of the operating wavelengths, as a function of the coupler transmittance T is plotted in FIGURE 2. It is seen, for example, that the coupling required for maximum output is different for the two wavelengths, and, in general, the embodiment of FIGURE 1 can be used advantageously to optimize the power output at a single wavelength from a multi-wavelength laser medium.

An important feature of the present invention is that the coupler introduces very little loss in the optical resonator. The P polarization components are introduced locally and then are directly transmitted into the output beam 12. Thus these components are not incident on the Brewster surfaces 6 where they would be lost from the resonator by reflection. Also, the amount of power passing through the film 8 is relatively small thereby minimizing absorption and scattering losses and also preventing damage to both the film and the prism cement. Also it should be noted that the laser radiation will be much more strongly polarized than in the absence of the coupler where the Brewster surfaces 6 are relied on alone to provide the polarization.

Referring, again, to Equation 1, it can be seen that the coupler transmittance can be varied by variation of the delay $\phi$ as well as the angle $\theta$. This is accomplished in the modification of FIGURE 2 by a voltage-variable retardation plate 21, such as a potassium dihydrogen phosphate (KDP) crystal driven by a variable voltage source 22 to exhibit the well-known Pockels effect. A retardation plate 23 may be included, if desired, to provide an operating bias. The application of a signal to the crystal 21 by source 22 will result in modulator operation whereby the signal is impressed on the output beam 12. It should be noted that the rapid change in power with changes in coupling transmittance enables the modulation of a signal with considerably less voltage than would be required in the case of an electro-optical modulator operated external to the laser resonator. An internal modulator has additional advantages such as the ability to phase lock the various frequency modes of the laser.

In the embodiment of FIGURE 4, a non-linear crystal 31 such as KDP is placed in the resonator for purposes of frequency doubling. The interaction of the strong resonator field, polarized in the S direction, with the crystal 31 causes a second harmonic of the laser frequency to be generated which is polarized in the P direction and thus coupled out through the beam splitter 7 to form a beam 32 having a wavelength which is one-half of the laser wavelength. The output is generally useful as a source of radiation.

An arrangement similar to that just described can also be used for various forms of spectroscopic analysis of a sample placed in the resonator at the location of element 31. In this case, P components of radiation generated by the interaction of the laser radiation with the sample are coupled out at 32 for spectroscopic examination. Such an arrangement has the particular advantage that the interaction takes place in the resonator where the laser radiation field is substantially in excess of that available in an external laser beam.

The remaining elements of FIGURE 4 illustrate the use of the frequency-doubled output 32 as a source of pumping radiation for a parametric amplifier. In this case a third mirror 33 is provided which, together with the mirror 3, forms an optical resonator for frequency-doubled radiation. This frequency-doubled radiation interacts with a second non-linear crystal 34 to provide amplified parametric generation of radiation at a wavelength which is substantially equal to the original pumping laser wavelength. This parametric radiation is polarized in the S direction and so is reflected by the underside of film 8 to a fourth mirror 35 which, together with mirror 33, forms a so-called idler optical resonator at the parametric wavelength. As is well-known, a small change made in the length of the idler resonator, as by energizing a piezo-electric crystal (not shown) mounted with mirror 35 to thereby change its position along the beam as indicated by arrow 36, will provide a corresponding change in the parametric wavelength. Such change is thus used to provide a wavelength tuneable output 37 which is coupled out by partial transmission of mirror 35. This arrangement requires that the mirrors 3 and 33 be highly reflecting at both the fundamental and second-harmonic wavelengths, which is easily accomplished by known dielectric coating techniques since it is not necessary to provide any transmission through these mirrors. It is to be noted that the beam splitter 7 is used to provide a polarization-dependent coupling out of both the laser resonator 3, 4 and overlapping parametric amplifier resonator 3, 33.

I claim:

1. Optical resonator apparatus, comprising: resonator means for constraining optical radiation in a first confined region; means for introducing a given polarization component to said optical radiation in a portion of said confined region; coupling means for selectively transmitting radiation of said given polarization out of said confined region from said portion thereof; resonator means for constraining optical radiation in a second confined region which overlaps with said first confined region; and means for introducing a polarization component to the optical radiation in said second confined region, said component being orthogonal to said given polarization, and said coupling means being positioned to transmit optical radiation of said given polarization from said first confined region to said second confined region and to reflect optical radiation of said orthogonal polarization out of said second confined region.

2. Apparatus according to claim 1 including an active laser medium for amplifying the radiation constrained in said first confined region by stimulated emission interaction therewith, and wherein said means for introducing said given polarization component to said radiation comprises a sample of matter which interacts with said amplified radiation to generate radiation of said given polarization at a harmonic of said amplified radiation, said harmonic radiation being transmitted into said second confined region, and said means for introducing an orthogonal polarization component in said second confined region comprises a sample of matter which interacts with said confined radiation to generate parametrically-amplified radiation of said orthogonal polarization which is reflected from said second confined region.

3. Apparatus according to claim 2 including means forming an idler resonator for constraining said parametrically-amplified radiation in a third confined region which overlaps said second confined region, said coupling means being positioned to reflect optical radiation of said parametrically-amplified radiation along a given path of said third confined region.

4. Apparatus according to claim 3 including means for changing the effective optical length of said given path to thereby change the wavelength of said parametrically-amplified radiation.

5. Apparatus according to claim 3 wherein said coupling means is a multilayer film means.

References Cited

UNITED STATES PATENTS

| | | | |
|---|---|---|---|
| 3,409,819 | 11/1968 | Soffer | 321—69 |
| 3,366,792 | 1/1968 | Ohm | 332—7.51 |
| 3,229,223 | 1/1966 | Miller | 332—7.51 |
| 3,267,385 | 8/1966 | Ashkin | 330—4.6 |
| 3,200,342 | 8/1965 | Kibler | 330—4.5 |

OTHER REFERENCES

Kroll: "Proceedings of the IEEE," January 1963, pp. 110–114.

Thomas et al.: "Journal of Scientific Instruments," May 1964, pp. 277–279.

"Proceedings of the Symposium on Optical Masers," edited by J. Fox, Polytechnic Press, New York, 1963, pp. 245–247 (article by Gurs et al.).

JOHN KOMINSKI, Primary Examiner

D. R. HOSTETTER, Assistant Examiner

U.S. Cl. X.R.

321—69; 330—4.5, 56; 331—94.5; 333—83; 350—150, 157